United States Patent Office 3,340,269
Patented Sept. 5, 1967

3,340,269

1-SUBSTITUTED 4-ACYL-2,3-DIOXO-PIPERIDINE

Herbert Morton Blatter, Millburn, N.J., assignor to Ciba Corporation, New York, N.Y., a corporation of Delaware No Drawing. Filed Sept. 8, 1964, Ser. No. 395,016
4 Claims. (Cl. 260—294.7)

ABSTRACT OF THE DISCLOSURE 1-substituted 4-acyl-2,3-dioxo-piperidines of the formula

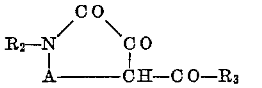

$R_2$=aliphatic, araliphatic or aromatic radical,
$R_3$=H or $R_2$,
A=alkylene with 2 ring-C, such as 1-(4-methyl-phenyl)-4-propionyl-2,3-dioxo-piperidine, are valuable intermediates in the manufacture of anti-inflammatory 7 - oxo - 4,5,6,7 - tetrahydro - pyrazolo [3,4-c]pyridines.

The present invention concerns 4,5,6,7-tetrahydro-H-pyrazolo[3,4-c]pyridine compounds, more especially, 7-oxo-4,5,6,7-tetrahydro-H-pyrazolo[3,4-c]pyridines having one of the following two ring systems

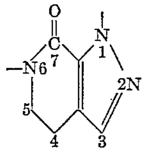

and

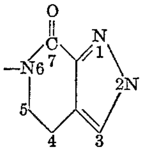

More particularly, the present invention relates to 1-$R_1$-6-$R_2$-7-oxo-4,5,6,7 - tetrahydro - 1H-pyrazolo[3,4-c]pyridines and 2-$R_1$-6-$R_2$-7-oxo-4,5,6,7-tetrahydro-2H-pyrazolo [3,4-c]pyridines, in which $R_1$ is hydrogen or an organic radical, and $R_2$ is an organic radical, salts thereof, N-oxides thereof, salts of N-oxides thereof or quaternary ammonium compounds thereof, as well as process for the preparation of the above compounds.

While $R_1$ may represent hydrogen, it stands more especially for an organic radical. The latter may be an organic radical with aliphatic characteristics, such as an aliphatic group, for example, alkyl, particularly lower alkyl, e.g. methyl, ethyl, n-propyl, isopropyl, n-butyl, isobutyl, n-pentyl, n-hexyl, n-heptyl and the like, as well as higher alkyl, e.g. n-heptyl, n-octyl, n-nonyl, n-decyl, n-undecyl, n-dodecyl and the like, or alkenyl, such as lower alkenyl, e.g. allyl and the like, a cycloaliphatic group, such as cycloalkyl having from three to eight, preferably from five to six, ring carbon atoms, e.g. cyclopentyl or cyclohexyl, as well as cyclopropyl, cycloheptyl and the like or cycloalkenyl having from five to eight, preferably from five to six, ring carbon atoms, e.g. 2-cyclopentenyl, 1-cyclohexenyl, 3-cyclohexenyl and the like, as well as 1-cycloheptenyl, 3-cycloheptenyl, 1-cyclooctenyl and the like, a cycloaliphatic-aliphatic group, such as cycloalkyl-lower alkyl, in which cycloalkyl has from three to eight, preferably from five to six, ring carbon atoms, e.g. cyclopentylmethyl, 3-cyclopentylpropyl, cyclohexylmethyl, 2-cyclohexylethyl and the like, as well as cyclopropylmethyl, 1-cyclopropylethyl, cycloheptylmethyl and the like, or cycloalkenyl-lower alkyl, in which cycloalkenyl has from five to eight, preferably from five to six, ring carbon atoms, e.g. 1-cyclopentenylmethyl, 2 - cyclohexenylmethyl, 2-(3-cyclohexenyl)-ethyl and the like, or an aryl-aliphatic group, such as carbocyclic aryl-lower aliphatic groups, particularly monocyclic carbocyclic aryl-lower alkyl, for example, phenyl-lower alkyl, e.g. benzyl, 1-phenylethyl, 2-phenylethyl and the like, or substituted phenyl-lower alkyl, as well as bicyclic carbocyclic aryl-lower alkyl, for example, naphthyl-lower alkyl, e.g. 1-naphthylmethyl, 2-naphthylmethyl and the like, or substituted naphthyl-lower alkyl, or a heterocyclic aryl-lower aliphatic group, especially azacyclic aryl-lower alkyl, for example, pyridyl-lower alkyl, e.g. 2-pyridylmethyl, 4-pyridylmethyl and the like, or substituted pyridyl-lower alkyl, or any other suitable organic group with aliphatic characteristics.

An organic radical representing $R_1$ is also an organic radical with aromatic properties, i.e. an aryl group, such as carbocyclic aryl, especially monocyclic carbocyclic aryl, e.g. phenyl or substituted phenyl, in which one or more than one of the positions available for substitution is substituted, as well as naphthyl or substituted naphthyl and the like, or heterocyclic aryl, such as azacyclic aryl, for example, pyridyl, e.g. 2-pyridyl, 3-pyridyl or 4-pyridyl, or substituted pyridyl, thiacyclic aryl, for example, thienyl, e.g. 2-thienyl and the like, or substituted thienyl, or oxacyclic aryl, for example, furyl, e.g. 2-furyl and the like, or substituted furyl, or any other aryl group.

The above organic radicals representing $R_1$ may also have one or more than one of the same or of different substituents attached to any of the positions available for substitution. Substituents are, for example, lower alkyl, e.g. methyl, ethyl, n-propyl, isopropyl, n-butyl and the like, hydroxyl, etherified hydroxyl, especially lower alkoxy, e.g. methoxy, ethoxy, n-propyloxy, butyloxy and the like, esterified hydroxyl, especially halogeno, e.g. fluoro, chloro, bromo and the like, etherified mercapto, especially lower alkyl-mercapto, e.g. methylmercapto, ethylmercapto and the like, amino, such as N,N-di-substituted amino, for example, N,N-di-lower alkyl-amino, e.g. N,N-dimethylamino, N,N-diethylamino and the like, N,N-alkylene-imino, in which alkylene has from four to seven carbon atoms, e.g. 1-pyrrolidino, 1-piperidino, 1-N,N-(1,6-hexylene)-imino and the like, trifluoromethyl, carboxy, carbo-lower alkoxy, e.g. carbomethoxy, carbethoxy and the like, or any other equivalent substituent.

Substituted organic radicals representing $R_1$ are, for example, substituted lower alkyl radicals, such as hydroxy-lower alkyl, lower alkoxy-lower alkyl, N,N-di-lower alkyl-amino-lower alkyl, N,N-alkylene-imino-lower alkyl, in which alkylene has from four to seven carbon atoms, in which groups the substituent is separated by at least two carbon atoms from the nitrogen carrying the group $R_1$, substituted phenyl-lower alkyl, such as (lower alkyl)-phenyl-lower alkyl, (lower alkoxy)-phenyl-lower alkyl, (halogeno)-phenyl-lower alkyl, (lower alkyl-mercapto)-phenyl-lower alkyl, (N,N-di-lower alkyl-amino)-phenyl-lower alkyl, (trifluoromethyl)-phenyl-lower alkyl and the like, but, more especially, substituted phenyl, particularly (lower alkyl)-phenyl, (lower alkoxy)-phenyl, (halogeno)-phenyl, (lower alkyl-mercapto)-phenyl, (N,N-di-lower alkyl-amino)-phenyl, (trifluoromethyl)-phenyl and the like, as well as substituted pyridyl, e.g. (lower alkyl)-pyridyl and the like, or any other substituted organic radical.

The group $R_2$ is an organic radical, such as one of those representing $R_1$, but, more especially, an organic radical with aromatic properties, particularly a carbocyclic aryl radical, such as phenyl or substituted phenyl, e.g. (lower alkyl)-phenyl, (lower alkoxy)-phenyl, (halogeno)-phenyl, (lower alkyl-mercapto)-phenyl, (N,N-di-lower alkyl-amino)-phenyl, (trifluoromethyl)-phenyl and the like, as well as substituted naphthyl, or heterocyclic aryl, particularly pyridyl and the like.

The 3-position of the 4,5,6,7-H-pyrazolo[3,4-c]pyridine ring system may be unsubstituted, but is preferably substituted by an organic radical, such as one of those mentioned above, especially by lower alkyl, e.g. methyl, ethyl, n-propyl, isopropyl, n-butyl and the like, as well as by carbocyclic aryl, particularly phenyl or substituted phenyl, e.g. (lower alkyl)-phenyl, (lower alkoxy)-phenyl, (halogeno)-phenyl, (lower alkyl-mercapto)-phenyl, (N, N-di-lower alkyl-amino)-phenyl, (trifluoromethyl)-phenyl and the like.

The 4-position and the 5-position are usually unsubstituted, but may contain organic radicals, such as lower alkyl and the like.

Salts of the compounds of this invention are particularly the acid addition salts therof, such as the pharmaceutically acceptable acid addition salts thereof with inorganic acids, e.g. hydrochloric, hydrobromic, nitric, sulfuric, phosphoric acids and the like, or with organic acids, such as organic carboxylic acids, e.g. acetic, propionic, glycolic, malonic, succinic, maleic, hydroxymaleic, fumaric, malic, tartaric, citric, glucuronic, benzoic, salicylic, 4-aminosalicylic, 2-acetyloxybenzoic, pamoic, nicotinic, isonicotinic acid and the like, or organic sulfonic acids, e.g. methane sulfonic, ethane sulfonic, ethane 1,2-disulfonic, 2-hydroxyethane sulfonic, benzene sulfonic, toluene sulfonic, naphthalene 2-sulfonic acid and the like. Other acid addition salts are useful as intermediates for the preparation of the pure parent compounds or in a manufacture of other salts, as well as for identification or characterization purposes. Addition salts primarily used for the latter are, for example, those with certain inorganic acids, e.g. perchloric acid and the like, with acidic organic nitro compounds, e.g. picric, picrolonic, flavianic acid and the like, or with metal complex acids, e.g. phosphotungstic, phosphomolybdic, chloroplatinic, Reinecke acid and the like.

N-oxides are in the form of the free compounds or in the form of their salts, i.e. the acid addition salts, particularly the pharmaceutically acceptable acid addition salts, thereof; suitable acids for the formation of addition salts of N-oxides are those mentioned before.

Quaternary ammonium compounds of the compounds of this invention are especially the pharmaceutically acceptable quaternary ammonium compounds; quaternary ammonium compounds are derivatives formed with reactive esters of alcohols and acids, particularly with esters of aliphatic alcohols and strong acids. These esters are represented by aliphatic halides, especially lower alkyl halides, e.g. methyl, ethyl, n-propyl, isopropyl, or n-butyl chloride, bromide or iodide and the like, aliphatic sulfates, such as di-lower alkyl sulfates, e.g. dimethyl sulfate, diethyl sulfate and the like, lower alkyl organic sulfonates, such as lower alkyl lower alkane sulfonates, e.g. methyl or ethyl methane or ethane sulfonate and the like, or lower alkyl carbocyclic aryl sulfonates, e.g. methyl or ethyl benzene, p-toluene sulfonate or naphthalene 2-sulfonate and the like. Other reactive esters of alcohols are those with cycloaliphatic alcohols, especially the cycloalkyl halides, in which cycloalkyl has from there to eight, preferably from five to six, ring carbon atoms, e.g. cyclopropyl, cyclopentyl, cyclohexyl or cycloheptyl chloride, bromide or iodide and the like, those with cycloaliphatic-aliphatic alcohols, especially the cycloalkyl-lower alkyl halides, in which cycloalkyl has from three to eight, preferaby from five to six, ring carbon atoms, e.g. cyclopropylmethyl, cyclopentylmethyl, 3-cyclopentylpropyl, cyclohexylmethyl, 2-cyclohexylethyl or cycloheptylmethyl chloride, bromide or iodide and the like, and particularly those with araliphatic alcohols, especially the monocyclic carbocyclic aryl-lower alkyl halides, such as the phenyl-lower alkyl halides, e.g. benzyl, 1-phenylethyl or 2-phenylethyl chloride, bromide or iodide, or any other suitable reactive ester of an alcohol. Also included as quaternary ammonium compounds are the quaternary ammonium hydroxides, and the quaternary ammonium salts with other inorganic or, particularly, organic carboxylic acids, such as those mentioned before.

The compounds of this invention may be in the form of mixtures of isomeric compounds or of the single isomers.

Resulting compounds or derivatives thereof may contain water and/or solvent of crystallization.

The compounds of the present invention are more especially those having one of the formulae

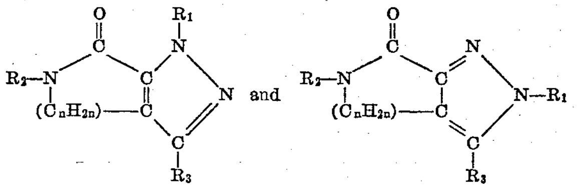

in which $R_1$ and $R_2$ have the previously-given meaning, $R_3$ is hydrogen or an organic radical, particularly lower alkyl, as well as carbocyclic aryl, and the group of the formula —($C_nH_{2n}$)— is lower alkylene, separating the nitrogen from the carbon, to which the radical is connected, by two carbon atoms, salts thereof, N-oxides thereof, salts of N-oxides thereof or quaternary ammonium compounds thereof.

The compounds of this invention have anti-inflammatory properties as demonstrated in the granuloma pouch test (Selye, Proc. Soc. Exp. Biol. & Med., vol. 82, p. 328 (1953), as modified by Robert et al., Acta Endocrinologica, vol. 25, p. 105 (1957)), as well as in the cotton pellet implant test (Meier et al., Experientia, vol. 6, p. 469 (1950)) or the pleural cavity inflammation test (Holtcamp, Fed. Proc., vol. 17, p. 379 (1958)). They are, therefore, useful as anti-inflammatory agents, for example, in place of corticoid steroids, e.g. cortisone, hydrocortisone and the like, in the treatment of tissue inflammations, such as arthritic inflammations or similar conditions.

Particularly useful are the compounds having one of the following formulae

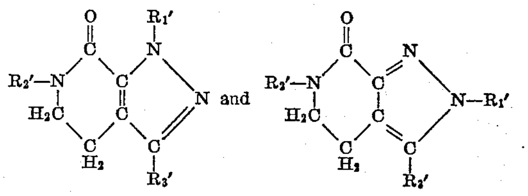

in which $R_1'$ is hydrogen, lower alkyl, phenyl, (lower alkyl)-phenyl, (lower alkoxyl)-phenyl, (halogeno)-phenyl, or (trifluoromethyl)-phenyl, $R_2'$ is phenyl (lower alkyl)-phenyl, (lower alkoxy)-phenyl, (halogeno)-phenyl, or (trifluoromethyl)-phenyl, and $R_3'$ is lower alkyl as well as phenyl, or acid addition salts, such as pharmaceutically acceptable acid addition salts, thereof.

The compounds of this invention are useful in the form of compositions for enteral, e.g. oral and the like, or parenteral use, which contain a pharmacologically effective amount of the active compound of this invention in admixture with a pharmaceutically acceptable organic or inorganic, solid or liquid carrier. For making up the latter, there are employed the usual carrier materials suitable for the manufacture of pharmaceutical compositions, such as water, gelatine, sugars, e.g. lactose, sucrose, glucose and the like, starches, e.g. corn starch, wheat starch, rice starch and the like, stearic acid or salts thereof, e.g. magnesium stearate, calcium stearate and the like, talc, vegetable oils, ethanol, stearyl alcohol, benzyl alcohol, gums acacia, tragacanth, polyalkylene glycols, propylene glycol or any other suitable excipient or mixtures thereof. The compositions may be in solid form, e.g. capsules, tablets, dragées, suppositories and the like, or in liquid form, e.g. solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. The above preparations are prepared according to the standard methods used for the manufacture of pharmaceutically acceptable compositions, which, if desired, may also contain, in combination, other physiologically useful substances.

The compounds of this invention are prepared according to per se conventional methods. I prefer to manufacture them by reacting a 1-$R_2$-4-acyl-2,3-dioxo-piperidine, in which $R_2$ has the previously-given meaning, and acyl is the radical of an organic carboxylic acid, particularly a compound of the formula

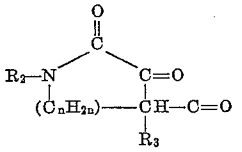

in which $R_2$, $R_3$ and the group of the formula $$—(C_nH_{2n})—$$

have the previously-given meaning, or a tautomer of such compound, with an N-$R_1$-hydrazine, particularly a compound of the formula $R_1$-NH-$NH_2$, in which $R_1$ has the previously-given meaning, or a salt thereof, and, if desired, converting a resulting salt into the free compound or into another salt, and/or, if desired, replacing in a resulting compound, in which a ring-nitrogen carries a hydrogen, such hydrogen by an organic radical, and/or, if desired, converting a resulting compound into an N-oxide or into a quaternary ammonium compound, and/or, if desired, converting a resulting compound or an N-oxide thereof into a salt thereof, and/or, if desired, converting a resulting N-oxide into the free compound, and/or, if desired, converting a resulting quaternary ammonium compound into another quaternary ammonium compound, and/or, if desired, converting a resulting mixture of isomeric compounds into the single isomers.

The above reaction is carried out under known conditions, preferably in the presence of a suitable solvent, e.g. ethanol and the like, and, if necessary, while cooling or, more especially, at an elevated temperature, in a closed vessel, and/or in the atmosphere of an inert gas, e.g. nitrogen. Usually, if a salt of a hydrazine is used, the free compound is liberated by the presence of a base, such as an alkali metal lower alkoxide and the like.

The above 1-$R_2$-4-acyl-2,3-dioxo-piperidine starting materials, such as those of the previously-shown formula, are new and are intended to be included within the scope of the invention, together with the process for their manufacture. The compounds of the formula

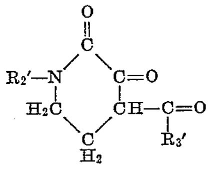

in which $R_2'$ and $R_3'$ have the previously-given meaning, or a tautomer thereof, are especially useful as the starting materials for the preparation of the above compounds.

They are obtained, for example, by treating an N-(3-acylpropyl) - N - (etherified hydroxy-oxalyl) - N - $R_2$-amine, particularly a compound of the formula

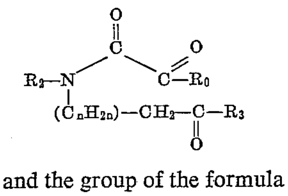

in which $R_2$, $R_3$ and the group of the formula $$—(C_nH_{2n})—$$

have the previously-given meaning, and $R_0$ is etherified hydroxyl, with a basic condensing reagent.

The etherified hydroxy-oxalyl group is primarily lower alkoxy-oxalyl, e.g. ethoxy-oxalyl and the like.

The ring closure is usually carried out by treating the intermediate compound (which may be obtained, for example, by reacting the N-(3-acyl-propyl)-N-$R_2$-amine, particularly a compound of the formula $$R_2—NH—(C_nH_{2n})—CH_2—C(=O)—R_3$$

in which $R_2$, $R_3$ and the group of the formula $$—(C_nH_{2n})—$$

have the previously-given meaning, with the half-ester of an oxalyl halide, e.g. chloride, such as a compound of the formula Hal—C(=O)—C(=O)—$R_0$, in which $R_0$ has the previously-given meaning, and Hal is halogeno, particularly chloro) with a base, if necessary, in the presence of a suitable diluent, the choice of which depends on the solubility of the intermediate and/or the reactivity of the basic condensing reagent. The latter is, for example, an alkali metal alcoholate, e.g. sodium or potassium methoxide, ethoxide, n-butoxide, tertiary butoxide and the like, or any other equivalent reagent. If necessary, ring closure is achieved at an elevated temperature, in a closed vessel, and/or in the atmosphere of an inert gas, e.g. nitrogen.

In a resulting compound having an N-unsubstituted ring-nitrogen atom, the hydrogen can be replaced by an organic radical according to known methods. Thus, in a resulting compound the hydrogen of an N-unsubstituted ring-nitrogen can be replaced by an organic radical with aliphatic characteristics by reacting such compound with a reactive ester of an alcohol of aliphatic characteristics, particularly an ester formed with a strong inorganic acid, e.g. hydrochloric, hydrobromic, hydriodic, sulfuric acid and the like, or a strong organic sulfonic acid, e.g. methane sulfonic, ethane sulfonic, 2-hydroxy-ethane sulfonic, p-toluene sulfonic acid and the like. Suitable reactive esters are, for example, lower alkyl halides, e.g. methyl, ethyl, n-propyl, isopropyl, n-butyl chloride, bromide or iodide and the like, phenyl-lower alkyl halides, e.g. benzyl, 1-phenylethyl, 2-phenylethyl chloride or bromide and the like, di-lower alkyl sulfates, e.g. dimethyl sulfate, diethyl sulfate and the like, lower alkyl-lower alkane sulfonates, e.g. methyl or ethyl methane sulfonate or ethane sulfonate and the like, lower alkyl p-toluene sulfonates, e.g. methyl p-toluene sulfonate and the like, or any other reactive ester of an alcohol of aliphatic characteristics. The above reaction is preferably carried out with the starting material present in the form of a metal compound, particularly of an alkali metal, e.g. lithium, sodium and the like, salt. The latter is prepared by treating the resulting N-unsubstituted compound with a suitable metal salt-forming reagent, for example, with an alkali metal hydride or amide, e.g. sodium or potassium hydride or amide and the like, or any other equivalent. The formation of the metal compound, as well as the treatment of the latter with the reactive ester is preferably carried out in the presence of a suitable diluent, if necessary, while cooling or at an elevated temperature, and/or in a closed vessel, and/or in the atmosphere of an inert gas, e.g. nitrogen.

A methyl group representing an organic radical of aliphatic characteristics substituting one of the ring-nitrogens of a resulting compound may also be introduced according to other methods, for example, by treating the N-unsubstituted compound with formaldehyde in the presence of a reducing reagent, e.g. formic acid, or in the presence of hydrogen and of a hydrogenation catalyst, e.g. palladium and the like, or any other suitable reducing reagent; such methylation reaction is carried out according to known methods.

An acid addition salt resulting from the above procedure of this invention may be converted into the free compound, for example, by reacting it with a basic reagent, such as a metal hydroxide, e.g. sodium hydroxide, potassium hydroxide, calcium hydroxide and the like, a metal carbonate, e.g. sodium, potassium or calcium carbonate or hydrogen carbonate and the like, ammonia, or any other suitable basic reagent, such as hydroxyl anion exchange preparation and the like.

A resulting acid addition salt may also be converted into another acid addition salt according to known methods, for example, by treatment with a suitable anion exchange preparation. Furthermore, an addition salt with an inorganic acid may be reacted with a metal, e.g. sodium, barium, silver and the like, salt of an acid in a suitable diluent, in which a resulting inorganic compound is insoluble and is thus removed from the reaction medium.

A free compound is converted into an acid addition salt thereof, by its treatment with an acid or an anion exchange preparation, preferably in the presence of a diluent.

N-oxides of the compounds of the present invention are formed according to known methods. For example, a resulting compound or a salt thereof (which may also be formed in situ), preferably a solution of such compound in an inert solvent or solvent mixture, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, or a persulfonic acid, e.g. p-toluene persulfonic acid and the like. In the N-oxidation reaction, an excess of the oxidation reagent and/or an increase in temperature should be avoided in order to prevent oxidative degradation.

A resulting N-oxide is converted into its acid addition salt by treatment with a suitable acid according to the previously described procedure.

An N-oxide may also be converted into the free compound according to known reduction procedures, for example, by treatment with hydrogen in the presence of a catalyst containing a metal of the Group VIII of the Periodic System, such as one of those previously-described, with nascent hydrogen, as generated, for example, by heavy metals, e.g. iron, zinc, tin and the like, in the presence of acids, e.g. acetic acid and the like, or any other appropriate reducing reagent or method.

Quaternary ammonium derivatives are prepared according to known methods, for example, by treating the free compounds with one of the reactive esters formed by an alcohol, preferably an aliphatic alcohol, and an acid, especially a strong acid, such as one of the previously-mentioned esters. Quaternization may be performed in the absence or presence of a solvent, under cooling, at room temperature or at an elevated temperature, at atmospheric pressure or in a closed vessel under pressure, and, if desired, in the atmosphere of an inert gas, e.g. nitrogen. Suitable diluents are more especially lower alkanols, e.g. methanol, ethanol, n-propanol, isopropanol, tertiary butanol, n-pentanol and the like, lower alkanones, e.g. acetone, ethyl methyl ketone and the like, organic acid amides, e.g. formamide, N,N-dimethylformamide and the like, aliphatic hydrocarbons, e.g. pentane, hexane and the like, halogenated hydrocarbon, e.g. methylene chloride, ethylene chloride and the like, monocyclic carbocyclic aryl hydrocarbon, e.g. benzene, toluene and the like, or any other suitable solvent or solvent mixture.

A resulting quaternary ammonium compound may be converted into other quaternary ammonium compounds, such as the quaternary ammonium hydroxides. The latter are, for example, obtained by reacting a quaternary ammonium halide with silver oxide, or a quaternary ammonium sulfate with barium hydroxide, or by treating a quaternary ammonium salt with a hydroxyl ion exchange preparation, by electrodialysis or any other suitable method. From a resulting quaternary ammonium hydroxide there may be obtained a quaternary ammonium salt by reacting the base with acid, for example, with one of the addition salt-forming acids previously mentioned.

A quaternary ammonium compound may also be converted directly into another quaternary ammonium salt without the formation of an intermediate quarternary ammonium hydroxide. For example, a quaternary ammonium iodide may be reacted with freshly prepared silver chloride or with hydrogen chloride in anhydrous methanol to yield the corresponding quaternary ammonium chloride. Furthermore, the anion of a quaternary ammonium compound, for example, a halide, such as the iodide, ion may be exchanged for another anion, for example, another halide, such as the chloride, ion by treatment with a suitable anion exchange preparation, such as, for example, with Amberlite IRA–400 (as described in U.S. Patent No. 2,591,573).

Resulting mixtures of isomeric compounds may be separated into single isomers according to known methods, based, for example, on physico-chemical differences, such as different solubilities, different boiling points and the like. Thus, they may be separated by fractional crystallization, fractional distillation and the like, if necessary, by using a derivative thereof, e.g. a salt and the like.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples are intended to illustrate the invention and are not to be construed as being limitations thereon. Temperatures are given in degrees centigrade.

*Example 1*

A mixture of 7.5 g. of 2,3-dioxo-1-(4-methyl-phenyl)-4-propionyl-piperidine, 6.0 g. of N-(4-fluoro-phenyl)-hydrazine hydrochloride and 0.9 g. of sodium methoxide in 400 ml. of absolute ethanol is refluxed for seventeen hours. The reaction mixture is filtered, the filtrate is evaporated to dryness under reduced pressure, and the oily residue is dissolved in methylene chloride. The organic solution is washed with water, dried over magnesium sulfate and evaporated under reduced pressure to yield 8.1 g. of a crude brown solid material, which is washed with diethyl ether and recrystallized from a mixture of acetone and hexane (decolorization with a charcoal preparation) to yield 5.5 g. of a light tan solid, M.P. 178–185°. This material represents a mixture of 3-ethyl-1-(4-fluoro-phenyl)-6-(4-methyl-phenyl)-7-oxo-4,5,6,7-tetrahydro-1H-pyrazolo[3,4-c]pyridine of the formula

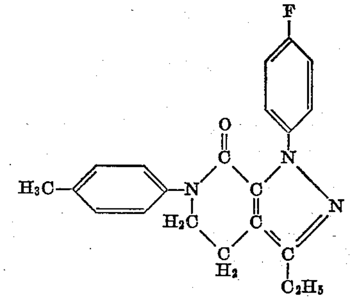

and 3-ethyl-2-(4-fluoro-phenyl)-6-(4-methyl-phenyl)-7-oxo-4,5,6,7-tetrahydro-2H-pyrazolo[3,4-c]pyridine of the formula

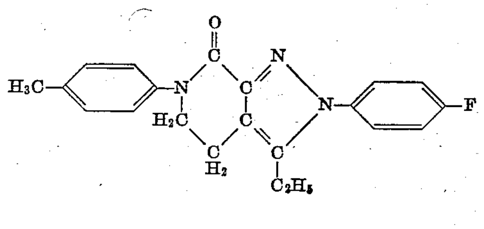

Upon further recrystallizations, an off-white material, melting at 188–190°, is obtained, which again is a mixture of the two compounds, albeit of a different composition. It analyzes as follows.

Calcd. for $C_{21}H_{20}FN_3O$: C, 72.18; H, 6.06; N, 12.03. Found: C, 72.42; H, 5.83; N, 11.84.

Its infrared absorption spectrum (taken in mineral oil) shows no —NH— stretching bands, and a strong broad >C=O absorption centered at 1670 cm.$^{-1}$ (not resolved), whereas its ultraviolet absorption spectrum (taken in methanol) shows $\lambda_{max.}$ at 269 m$\mu$ ($\epsilon$=14,280), and $\lambda_{min.}$ at 235 m$\mu$ ($\epsilon$=12,120).

The starting material used in the above procedure is prepared as follows: To 6.6 g. of magnesium turnings is added dropwise while stirring, a solution of 30.0 g. of ethyl bromide in about 100 ml. of anhydrous diethyl ether, which is followed by 30.0 g. of 1-(4-methyl-phenyl)-pyrrolidin-2-one in about 1,100 ml. of anhydrous diethyl ether. The addition of the latter lasts about 45 minutes, and cooling with ice is required occasionally. The reaction mixture is stirred for an additional two hours at room temperature, and is then decomposed with an excess of a dilute aqueous ammonium chloride solution while cooling and stirring. The organic layer is separated, washed with an aqueous solution of sodium chloride, dried over anhydrous magnesium sulfate and concentrated to a small volume. On standing while cooling, the desired 1-[N-(4-methyl-phenyl)-amino]-4-hexanone precipitates (yield: 30.0 g.) and is recrystallized from diethyl ether, M.P. 85–87°.

To a solution of 20.0 g. of 1-[N-(4-methyl-phenyl)-amino]-4-hexanone in 150 ml. of dry benzene is slowly added a suspension of 4.8 g. of sodium hydride (52.6 percent dispersion in mineral oil) in 150 ml. of dry benzene while stirring and maintaining an atmosphere of nitrogen. The reaction mixture is then refluxed for 15 minutes, cooled to room temperature and treated dropwise with 13.3 g. of ethyl oxalyl chloride while cooling with an ice-bath. After stirring for one-half hour, 12 ml. of absolute ethanol is carefully added while cooling, and after an additional thirty minutes, the reaction mixture is washed with water, dried over anhydrous sodium sulfate and evaporated.

The remaining oil, containing the desired 1-[N-ethoxyoxalyl)-N-(4-methyl-phenyl)-amino]-4-hexanone of the formula

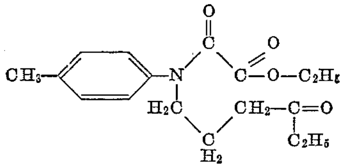

is dissolved in about 125 ml. of absolute ethanol and is treated with 5.3 g. of sodium methoxide in 100 ml. of absolute ethanol. The reaction mixture is refluxed for 1½ hours and is then evaporated under reduced pressure. The residue is taken up in water and filtered; the filtrate is acidified with dilute hydrochloric acid to pH 6, whereupon the 2,3-dioxo-1-(4-methyl-phenyl)-4-propionyl-piperidine of the formula

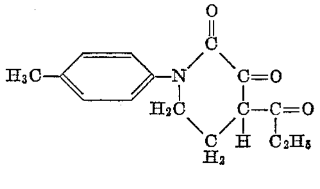

precipitates. A solution of the latter in diethyl ether is decolorized with a charcoal preparation; the desired product melts at 116–118°, after recrystallization from a mixture of diethyl ether and pentane.

*Example 2*

A solution of 6.0 g. of 2,3-dioxo-1-(4-methyl-phenyl)-4-propionyl-piperidine and 3.0 of N-phenyl-hydrazine in 100 ml. of absolute ethanol is refluxed for 22 hours, and then filtered. The filtrate is evaporated under reduced pressure to yield an orange-brown oil, which is dissolved in methylene chloride. The organic solution is washed with 50 ml. of a 5 percent aqueous solution of sodium hydroxide, followed by 50 ml. of water, dried over anhydrous magnesium sulfate and evaporated to dryness. The resulting orange oil crystallizes from a mixture of acetone and hexane to yield 2.76 g. of a light tan solid, which is substantially uniform and is either 3-ethyl-6-(4-methyl-phenyl)-1-phenyl-7-oxo-4,5,6,7-tetrahydro - 1H - pyrazolo [3,4-c]pyridine of the formula

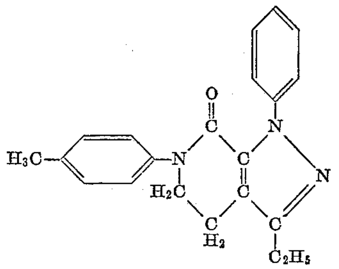

or the 3-ethyl-6-(4-methyl-phenyl)-2-phenyl-7-oxo-4,5,6,7-tetrahydro-2H-pyrazolo[3,4-c]pyridine of the formula

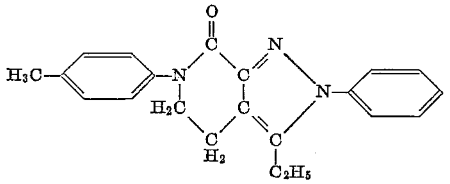

The product melts at 110–112° after several recrystallizations from a mixture of acetone and hexane. It analyzes as follows.

Calcd. for $C_{21}H_{21}N_3O$: C, 76.10; H, 6.39; N, 12.68. Found: C, 76.19; H, 6.59; N, 12.83.

Its infrared absorption spectrum (taken in mineral oil) shows no —NH— stretching bands, and a strong, broad >C=O absorption centered 1665 cm.$^{-1}$ (not resolved), whereas its ultraviolet absorption spectrum (taken in methanol) shows $\lambda_{max.}$ (shoulder) at 216 m$\mu$ ($\epsilon$=17,210) and at 270 m$\mu$ ($\epsilon$=13,450), and $\lambda_{min.}$ at 237 m$\mu$ ($\epsilon$=8,720)

*Example 3*

To 6.0 g. of 2,3-dioxo-1-(4-methyl-phenyl)-4-propionyl-piperidine in 100 ml. of ethanol is added 0.85 g. of anhydrous hydrazine (95%), and the reaction mixture is refluxed for 17 hours. The ethanol is then evaporated and the residue is crystallized from a mixture of acetone and hexane to yield 4.4 g. of the crude product which is either the 3-ethyl-6-(4-methyl-phenyl)-7-oxo-4,5,6,7-tetrahydro-1H-pyrazolo[3,4-c]pyridine of the formula

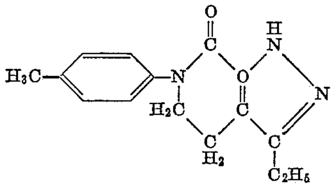

or the 3-ethyl-6-(4-methyl-phenyl)-7-oxo-4,5,6,7-tetrahydro-2H-prazolo[3,4-c]pyridine of the formula

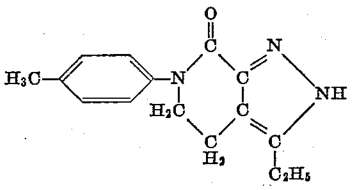

After repeated recrystallizations from a mixture of acetone and hexane, the white product melts at 177–179°, and analyzes as follows.

Calcd. for $C_{15}H_{17}N_3O$: C, 70.56; H, 6.71; N, 16.46. Found: C, 70.30; H, 6.75; N, 16.22.

Its infrared absorption spectrum (taken in mineral oil) shows a broad, strong —NH— band centered at 3182 cm.$^{-1}$ and a broad, strong >C=O absorption at 1659 cm.$^{-1}$, whereas its ultraviolet absorption spectrum (taken in methanol) shows $\lambda_{max.}$ at 245–249 m$\mu$ ($\epsilon$=9,840), and $\lambda_{min.}$ at 236 m$\mu$ ($\epsilon$=9,170).

*Example 4*

To a solution of 6.0 g. of 2,3-dioxo-1-(4-methyl-phenyl)-4-propionyl-piperidine in 150 ml. of ethanol is added 1.22 g. of N-methyl-hydrazine. The reaction mixture is refluxed for 24 hours, the solvent is evaporated and the residue is crystallized from a mixture of diethyl ether and pentane to yield 2.0 g. of a compound which is either the 3-ethyl-1-methyl-6-(4-methyl-phenyl)-7-oxo-4,5,6,7-tetrahydro-1H-pyrazolo[3,4-c]pyridine of the formula

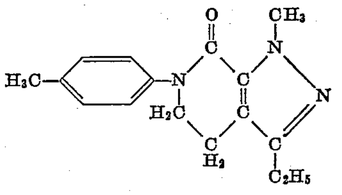

or the 3-ethyl-2-methyl-6-(4-methyl-phenyl)-7-oxo-4,5,6,7-tetrahydro-2H-pyrazolo[3,4-c]pyridine of the formula

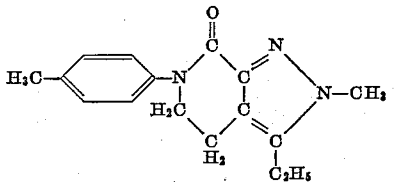

or a mixture of the two compounds. After recrystallization from a mixture of acetone and hexane, the product melts at 188–190° and analyzes as follows.

Calcd. for $C_{16}H_{19}N_3O$: C, 71.34; H, 7.11; N, 15.60. Found: C, 71.72; H, 7.13; N, 15.52.

Its infrared absorption spectrum (taken in mineral oil) shows no —NH— stretching band and a strong, broad >C=O absorption centered at 1672 cm.$^{-1}$, whereas its ultraviolet absorption spectrum (taken in methanol) shows $\lambda_{max.}$ at 252–254 m$\mu$ ($\epsilon$=10,640), and $\lambda_{min.}$ at 225 m$\mu$ ($\epsilon$=9,660).

*Example 5*

A solution of 4.0 g. of 4-benzoyl-2,3-dioxo-1-(4-methyl-phenyl)-piperidine in 75 ml. of ethanol is treated with 0.42 g. of anhydrous hydrazine (95 percent), and the reaction mixture is refluxed for 22 hours. The solvent is evaporated to yield 3.4 g. of the crude product, which is either the 6-(4-methyl-phenyl)-3-phenyl-7-oxo-1,2,3,4-tetrahydro-1H-pyrazolo[3,4-c]pyridine of the formula

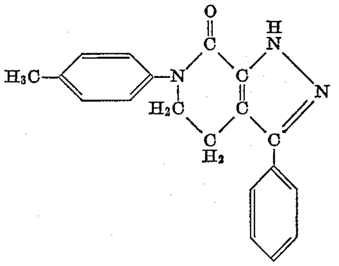

or the 6-(4-methyl-phenyl)-3-phenyl-7-oxo-1,2,3,4-tetrahydro-2H-pyrazolo[3,4-c]pyridine of the formula

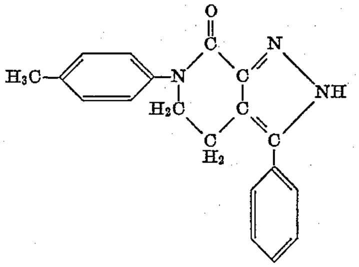

After two recrystallizations from methanol, it melts at 280°–282°, and analyzes as follows.

Calcd. for $C_{19}H_{17}N_3O$: C, 75.22; H, 5.65; N, 13.85. Found: C, 75.05; H, 5.91; N, 13.69.

Its infrared absorption spectrum (taken in mineral oil) shows a strong, broad —NH— stretching band centered at 3174 cm.$^{-1}$, and a strong, broad >C=O band at 1659 cm.$^{-1}$, and its ultraviolet absorption spectrum (taken in methanol) shows $\lambda_{max.}$ at 232 m$\mu$ (shoulder; $\epsilon$=21,330) and at 248 m$\mu$ ($\epsilon$=22,290), and $\lambda_{min.}$ at 222 m$\mu$ ($\epsilon$=19,820).

The starting material used in the above procedure is prepared as follows: To a Grignard reagent, prepared from 55.0 g. of bromobenzene and 8.4 g. of magnesium in 750 ml. of anhydrous diethyl ether, is added dropwise 30.0 g. of 1-(4-methyl-phenyl)-pyrrolidin-2-one in 250 ml. of diethyl ether. After stirring for 24 hours, the reaction mixture is treated with 400 ml. of a diluted aqueous solution of ammonium chloride, which is added dropwise and while stirring. The organic layer is separated, washed with dilute aqueous ammonium chloride and water, dried over magnesium sulfate and evaporated to dryness to yield the crude $\gamma$-[N-(4-methyl-phenyl)-amino]-butyrophenone, which melts at 105–107° after recrystallization from diethyl ether.

To a solution of 10.0 g. of $\gamma$-[N-(4-methyl-phenyl)-amino]-butyrophenone in about 100 ml. of dry benzene is added 1.95 g. of a 52.8 percent dispersion of sodium hydride in mineral oil, suspended in 100 ml. of dry benzene, while stirring and maintaining an atmosphere of nitrogen. The reaction mixture is refluxed for 15 minutes, cooled and treated with 5.5 g. of ethyl oxallyl chloride while stirring and cooling in an ice-bath. After agitating for thirty minutes, several ml. of absolute ethanol are added while cooling, and after 15 minutes, the reaction mixture is treated with an excess of water. The organic layer is separated, dried over magnesium sulfate and evaporated to yield the $\gamma$-[N-(ethoxy-oxallyl)-N-4-methyl-phenyl-amino]-butyrophenone of the formula

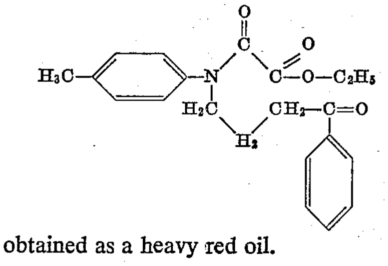

which is obtained as a heavy red oil.

The above product is dissolved in 150 ml. of absolute ethanol, treated with 2.2 g. of sodium methoxide and refluxed for 1½ hours. The ethanol is evaporated, and the residue is treated with water and filtered. The filtrate is acidified with dilute hydrochloric acid to pH 6; the resulting yellow, cloudy solution is extracted with methylene chloride, and the organic extract is dried over magnesium sulfate and evaporated. The resulting 4-benzoyl-2,3-dioxo-1-(4-methyl-phenyl)-piperidine of the formula

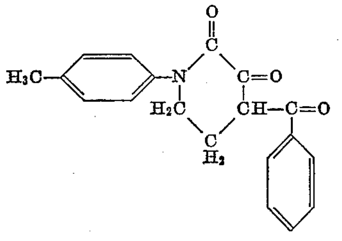

is recrystallized from a mixture of diethyl ether and pentane (including a treatment with a charcoal preparation); yield: 7.5 g.; it melts at 129–131°.

*Example 6*

To 6.0 g. of 4-benzoyl-2,3-dioxo-1-(4-methyl-phenyl)-piperidine in 100 ml. of ethanol is added a suspension of 3.24 g. of N-(4-fluoro-phenyl)-hydrazine hydrochloride in 50 ml. of ethanol, followed by a solution of 1.08 g. of sodium methoxide in 50 ml. of ethanol. The reaction mixture is refluxed for 24 hours and then evaporated to dryness. The crude material is washed twice with a 2 percent aqueous solution of sodium hydroxide, and then allowed to stand for several minutes in 250 ml. of diethyl ether to yield 4.7 g. of a pink solid material. The latter is recrystallized from ethanol (with charcoal decolorization) and from ethyl acetate to yield the pure product, which is either the 1-(4-fluoro-phenyl) - 6 - (4-methyl-phenyl)-3-phenyl-7-oxo-4,5,6,7 - tetrahydro - 1H-pyrazolo[3,4-c]pyridine of the formula

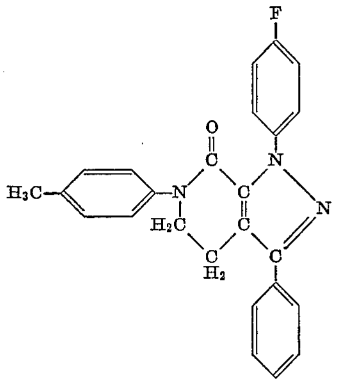

or the 2-(4-fluoro-phenyl)-6-(4-methyl-phenyl)-3-phenyl-7-oxo-4,5,6,7 - tetrahydro-2H-pyrazolo[3,4-c]pyridine of the formula

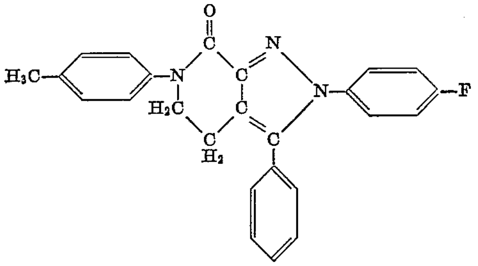

It melts at 228–229°, and analyzes as follows.

Calcd. for $C_{25}H_{20}FN_3O$: C, 75.54; H, 5.08; N, 10.58. Found: C, 75.24; H, 5.05; N, 10.65.

Its infrared absorption spectrum (taken in mineral oil) shows a sharp, strong >C=O band at 1692 cm.$^{-1}$, and its ultraviolet absorption spectrum (taken in methanol) shows $\lambda_{max.}$ at 234 m$\mu$ (shoulder; $\epsilon$=22,710) and at 273 m$\mu$ ($\epsilon$=18,770), and $\lambda_{min.}$ at 254 m$\mu$ ($\epsilon$=17,130).

*Example 7*

Other compounds, which are prepared according to the above-described and illustrated procedure by selecting the appropriate starting materials, are, for example, 1 - cyclohexyl - 3 - methyl-6-phenyl-7-oxo-4,5,6,7 - tetrahydro-1H-pyrazolo[3,4-c]pyridine and/or 2 - cyclohexyl-3-methyl - 6 - phenyl-7-oxo-4,5,6,7 - tetrahydro-2H-pyrazolo[3,4-c]pyridine, prepared by reacting 4-acetyl-2,3-dioxo-1-phenyl-piperidine with N-cyclohexyl-hydrazine;

1-cyclopentylmethyl - 6 - (4-chloro-phenyl)-3-isopropyl-7 - oxo - 4,5,6,7-tetrahydro-1H-pyrazolo[3,4-c]pyridine and/or 2-cyclopentylmethyl - 6 - (4-chloro-phenyl)-3-isopropyl - 7 - oxo-4,5,6,7-tetrahydro-2H-pyrazolo[3,4-c]pyridine, prepared by reacting 2,3-dioxo-1-(4-chloro-phenyl)-4-isobutyryl-1-piperidine with N - cyclopentyl-methyl-hydrazine;

1-benzyl - 6 - methyl - 3 - (4 - methyl-phenyl)-7-oxo-4,5,6,7 - tetrahydro-1H-pyrazolo[3,4-c]pyridine and/or 2-benzyl - 6 - methyl - 3 - (4-methyl-phenyl)-7-oxo-4,5,6,7-tetrahydro - 2H - pyrazolo[3,4-c]pyridine, prepared by reacting 2,3-dioxo-1-methyl-4-(4-methyl-benzoyl)-piperidine with N-benzyl-hydrazine;

6 - (3,4 - dichloro - phenyl) - 3 - ethyl - 1 - (4 - methoxy-phenyl) - 7 - oxo-4,5,6,7-tetrahydro-1H-pyrazolo[3,4-c]pyridine and/or 6-(3,4 - dichloro-phenyl)-3-ethyl-2-(4-methoxy-phenyl) - 7 - oxo - 4,5,6,7-tetrahydro-2H-pyrazolo[3,4-c]pyridine, prepared by reacting 1-(3,4-dichloro-phenyl) - 2,3 - dioxo - 4 - propionyl-piperidine with N-(4-methoxy-phenyl)-hydrazine;

3-ethyl-6-(4-methoxy-phenyl) - 7 - oxo - 1 - (4 - trifluoro-methyl-phenyl) - 4,5,6,7 - tetrahydro-1H-pyrazolo[3,4-c]pyridine and/or 3-ethyl - 6 - (4-methoxy-phenyl)-7-oxo-2-(4 - trifluoromethyl-phenyl) - 4,5,6,7-tetrahydro-2H-pyrazolo[3,4-c]pyridine, prepared by reacting 2,3-dioxo-1-(4-methoxy-phenyl) - 4 - propionyl-piperidine with N-(4-trifluoromethyl-phenyl)-hydrazine;

3-benzyl-6-(4 - bromo-phenyl) - 1 - (2 - pyridyl)-7-oxo-4,5,6,7 - tetrahydro-1H-pyrazolo[3,4-c]pyridine and/or 3-benzyl - 6 - (4-bromo-phenyl) - 2 - (2 - pyridyl)-7-oxo - 4,5,6,7 - tetrahydro-2H-pyrazolo[3,4-c]pyridine, prepared by reacting 1-(4-bromo-phenyl)-2,3-dioxo-4-phenylacetyl-piperidine with N-(2-pyridyl)-hydrazine;

3-ethyl - 5 - methyl - 1 - (4 - methyl-phenyl)-6-phenyl-7-oxo-4,5,6,7 - tetrahydro - 1H - pyrazolo[3,4-c]pyridine and/or 3-ethyl-5-methyl-2-(4-methyl-phenyl)-6-phenyl-7-oxo-4,5,6,7 - tetrahydro-2H-pyrazolo[3,4-c]pyridine, prepared by reacting 2,3 - dioxo-6-methyl-1-phenyl-4-propionyl-piperidine with N-(4-methyl-phenyl)-hydrazine;

3-ethyl-6-(4 - methyl-phenyl) - 1 - (4 - N,N - dimethyl-amino-phenyl) - 7 - oxo - 4,5,6,7 - tetrahydro-1H-pyrazolo[3,4-c]pyridine and/or 3 - ethyl - 6 - (4 - methyl-phenyl)-2-(4 - N,N - dimethylamino-phenyl) - 7 - oxo-4,5,6,7 - tetrahydro-2H-pyrazolo[3,4 - c]pyridine, prepared by reacting 2,3-dioxo-1-(4-methyl-phenyl)-4-propionyl-piperidine with N-(N,N-dimethylamino-phenyl)-hydrazine;

3-cyclohexyl - 6 - (2 - N,N-diethylaminoethyl)-1-(2-methoxyethyl) - 7 - oxo-4,5,6,7-tetrahydro-1H-pyrazolo[3,4-c]pyridine and/or 3-cyclohexyl-6-(2-N,N-diethyl-aminoethyl) - 2 - (2-methoxyethyl)-7-oxo-4,5,6,7-tetrahydro-2H-pyrazolo[3,4-c]pyridine, prepared by reacting 1-(2 - N,N-diethylaminoethyl)-2,3-dioxo-4-hexahydrobenzoyl-piperidine with N-(2-methoxyethyl)-hydrazine;

1-allyl - 3 - ethyl-6-(4 - methylmercapto-phenyl)-7-oxo-4,5,6,7 - tetrahydro-1H-pyrazolo[3,4-c]pyridine and/or 2-allyl - 3 - ethyl-6-(4-methylmercapto-phenyl)-7-oxo-4,5,6,7-tetrahydro - 2H - pyrazolo[3,4-c]pyridine, prepared by reacting 2,3-dioxo-1-(4-methylmercapto-phenyl)-4-propionyl-piperidine with N-allyl-hydrazine, and the like.

The above compounds, such as the 3-ethyl-1-(4-fluoro-phenyl)-6-(4-methyl-phenyl)-7-oxo - 4,5,6,7 - tetrahydro-1H-pyrazolo[3,4-c]pyridine and the like, when treated with a suitable acid, e.g. hydrochloric acid, picric acid and the like, are converted into their acid addition salts, such as the 3-ethyl-1-(4-fluoro-phenyl)-6-(4-methyl-phenyl)-7-oxo-4,5,6,7-tetrahydro-1H-pyrazolo[3,4 - c]pyridine hydrochloride, 3-ethyl-1-(4-fluoro-phenyl)-6-(4 - methyl-phenyl)-7-oxo - 4,5,6,7 - tetrahydro-1H-pyrazolo[3,4-c] pyridine picrate and the like.

What is claimed is:

1. A 1-substituted 4-acyl-2,3-dioxo-piperidine having the formula

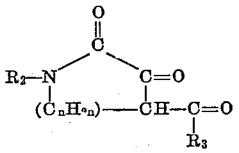

in which $R_2$ is a member selected from the group consisting of lower alkyl, lower alkenyl, cycloalkyl and cycloalkyl-lower alkyl with 3 to 8 ring-carbon atoms, cycloalkenyl and cycloalkenyl-lower alkyl with 5 to 8 ring-carbon atoms, hydroxy-lower alkyl, lower alkoxy-lower alkyl, di-lower alkylamino-lower alkyl and 4 to 7 carbon alkylene-imino-lower alkyl in which the heteroatoms are separated from the 1-nitrogen atom by at least 2 carbon atoms, phenyl-lower alkyl, (lower alkyl)-phenyl-lower alkyl, (lower alkoxy)-phenyl-lower alkyl, (halogeno)-phenyl-lower alkyl, (lower alkylmercapto)-phenyl-lower alkyl, (di-lower alkylamino)-phenyl-lower alkyl, (trifluoromethyl)-phenyl-lower alkyl, phenyl, (lower alkyl)-phenyl, (lower alkoxy) - phenyl, (halogeno) - phenyl, (lower alkylmercapto)-phenyl, (di-lower alkylamino)-phenyl, (trifluoromethyl)-phenyl, pyridyl and (lower alkyl)-pyridyl, $R_3$ is a member selected from the group consisting of hydrogen and one of the radicals listed for $R_2$ and the group of the formula $-(C_nH_{2n})-$ is lower alkylene, separating the nitrogen from the carbon by two carbon atoms.

2. A compound of the formula

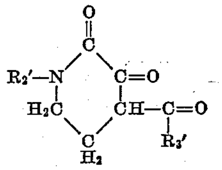

in which $R_2'$ is a member selected from the group consisting of phenyl, (lower alkyl)-phenyl, (lower alkoxy)-phenyl, (halogeno)-phenyl, and (trifluoromethyl)-phenyl, and $R_3'$ is a member selected from the group consisting of lower alkyl and phenyl.

3. 2,3-dioxo-1-(4-methyl - phenyl)-4-propionyl-piperidine.

4. 4-benzoyl-2,3-dioxo - 1 - (4-methyl-phenyl)-piperidine.

References Cited

UNITED STATES PATENTS 3,161,647 12/1964 Denss et al. -------- 260—294.7

OTHER REFERENCES

Theilheimer: Synthetic Methods of Org. Chem., vol. II, p. 397, reaction 923, Karger, N.Y., 1957.

WALTER A. MODANCE, *Primary Examiner.*

A. D. SPEVACK, *Assistant Examiner.*